Patented Dec. 13, 1932

1,890,718

UNITED STATES PATENT OFFICE

WILHELM BAUER AND JOSEF HALLER, OF LEVERKUSEN-WIESDORF, AND GEORG RÖSCH, OF COLOGNE-MULHEIM, GERMANY, ASSIGNORS TO GENERAL ANILINE WORKS, INC., OF NEW YORK, N. Y., A CORPORATION OF DELAWARE

VAT DYESTUFF OF THE THIONAPHTHENE-INDIGOID SERIES

No Drawing. Application filed March 19, 1931, Serial No. 523,932, and in Germany March 21, 1930.

The present invention relates to new vat dyestuffs being at the same time of the indigoid and anthraquinoid type, more particularly it relates to dyestuffs of the probable general formula

wherein J means the radical of an indigoid dyestuff of the group consisting of thionaphthene indole indigos, thionaphthene-acenaphthene indigos and thioindigos, A stands for a substituted or unsubstituted anthraquinone nucleus, n means one of the numbers 1 or 2 and wherein the —CO.NH.A group is linked to an aryl nucleus of the indigoid dyestuff radical.

As types of the dyestuffs falling within the scope of the invention the following may be mentioned by way of example:—

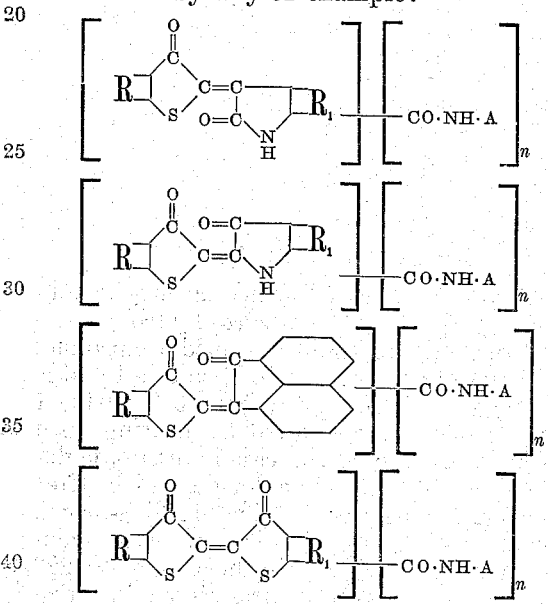

In these formulæ R and R₁ mean substituted or unsubstituted benzene or naphthalene nuclei, A a substituted or unsubstituted anthraquinone nucleus and n one of the numbers 1 or 2. The —CO—NH—A group is linked to an aromatic nucleus of the indigoid radical of the dyestuffs.

It is known that by the condensation of hydroxythionaphthenes with isatins vat dyestuffs of the indigoid series can be obtained. The products produced from unsubstituted isatin are of small value as vat dyestuffs, since they either decompose in the vat or, even when they can be vatted without decomposition, possess only little affinity to the vegetable fibre and are only converted into useful vat dyestuffs by halogenation.

In accordance with the present invention vat dyestuffs of superior tinctorial properties are obtained, when the above specified indigoid compounds are substituted in the carbocyclic ring of the isatin residue by a carbonyl-aminoanthraquinone group

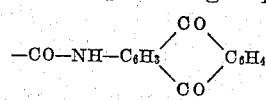

Dyestuffs of this kind can be obtained, for example, in the following manner:—

An isatin carboxylic acid is first condensed with hydroxy-thionaphthene or a homologue, or nuclear substitution product thereof, which may also be derived, for example, from naphthalene. For the condensation also such compounds may be used, as are converted during the reaction into hydroxy-thionaphthenes, such as for example, the corresponding carboxylic acids, acetyl derivatives and the like. Thus are obtainable indigoid compounds, which still contain a carboxylic acid group in the carbocyclic ring system of the isatin residue and are consequently sensitive to alkali. When the carboxylic acid is now converted into the acid chloride or some other reactive carboxylic acid derivative and this is caused to react with an aminoanthraquinone, (which can also be substituted in the nucleus as desired), there are produced in an excellent yield fast new vat dyestuffs, containing both an indigoid and an anthraquinone residue. The process can also be carried out by first converting the isatin carboxylic acid into the corresponding acid chloride or some other reactive derivative, causing the same to react with an aminoanthraquinone and condensing the resulting isatin - carbonyl - aminoanthraquinones, (which are already themselves vat dyestuffs) with hydroxy-thionaphthenes. By this process the same dyestuffs are formed as in the process previously described.

In accordance with a further feature of the present invention a hydrogen atom of the carbocyclic ring system of the thionaphthene residue in indigoid vat dyestuffs is replaced by a carbonyl-aminoanthraquinone group. By condensing hydroxy-thionaphthenes containing a carboxylic acid group in the carbocyclic ring system, or reactive α-derivatives or nuclear substitution products thereof, with the components customarily used for the manufacture of indigoid dyestuffs, for example, with cyclic o-diketones or cyclic compounds containing a reactive $CO-CH_2$-group, or reactive α-derivatives thereof, which compounds may likewise contain a carboxylic acid group attached to a carbocyclic ring system, indigoid dyestuffs are obtained, containing one or two carboxylic acid groups in the carbocyclic ring systems. By oxidizing hydroxy-thionaphthenes containing a carboxylic acid group in the carbocyclic ring system, or substitution products thereof, for example, with potassium ferri-cyanide or air in the presence of copper salts, there are obtained thioindigos containing carboxylic acid groups as substituents. The carboxylic acid groups of all these indigoid dyestuffs can be caused to react in the customary manner, for example, after transformation into the corresponding acid chlorides, with aminoanthraquinones. In this manner new vat dyestuffs are likewise obtained, which are at the same time of the indigoid and anthraquinoid type.

The new vat dyestuffs obtainable according to the processes described above, form yellowish-orange to black crystals, difficultly soluble in the usual organic solvents, soluble in strong sulfuric acid with most various colorations. They can be vatted easily, have a good affinity to textile fibres and yield, especially on cotton, clear and full dyeings possessing good fastness properties. The dyestuffs are, moreover, likewise well suited for calico printing.

The following examples illustrate our invention, without, however, restricting it thereto, the parts being by weight:—

Example 1

191 parts of finely powdered isatin-7-carboxylic acid and 185 parts of 5-chlorohydroxy-thionaphthene are heated to 100° C., with stirring, in 2000 parts of glacial acetic acid with the addition of 10 parts of hydrochloric acid, until the condensation is complete. The dyestuff, which separates in the calculated amount in the form of a red precipitate, is isolated, washed and dried.

357 parts of the finely powdered intermediate product are heated, with stirring, to 150–160° C. with 250 parts of thionyl chloride in ten times the quantity of ortho-dichlorobenzene. Partial solution occurs with evolution of sulfur dioxide and hydrochloric acid and the acid chloride immediately separates. As soon as the reaction is complete, which is shown by the slackening of the evolution of gases, the reaction mass is allowed to cool. The chloride, which separates in a crystalline form, is filtered, washed and dried.

375 parts of this chloride are heated to 160–180° C., while stirring, with 223 parts of alpha-aminoanthraquinone in nitrobenzene. Temporary solution occurs and with evolution of hydrochloric acid the dyestuff immediately begins to separate while still hot. As soon as the evolution of gas has slackened, the reaction mixture is allowed to cool somewhat. The dyestuff is then filtered while still hot, washed and dried. It forms a red crystalline powder, which is nearly insoluble in the usual organic solvents. The coloration of the solution in sulfuric acid is olive brown. With alkaline hydrosulfite it yields a reddish-brown vat, from which cotton, after oxidation and soaping, is dyed deep clear yellowish red shades, which are distinguished by superior fastness to boiling and chlorine. The new product most probably corresponds to the formula:—

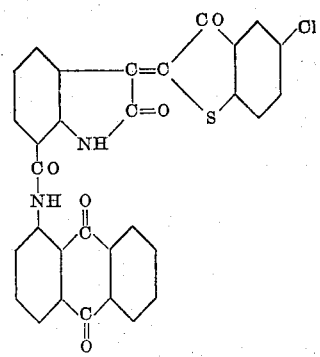

Example 2

From 191 parts of isatin-7-carboxylic acid and 200 parts of 4.5-benzo-hydroxy-thionaphthene the indigoid intermediate product is produced as described in Example 1 and is obtained as a brown powder. 373 parts of this powder are converted by heating with 250 parts of thionyl chloride in ortho-dichlorobenzene into the acid chloride, which, after isolation, forms a crystalline blackish-brown powder. 391 parts of this powder are condensed to the dyestuff by heating with 223 parts of alpha-aminoanthraquinone in nitrobenzene. The yield exceeds 80%. The dyestuff is a brown crystalline powder, which is nearly insoluble in the usual organic solvents even on heating. It dissolves in sulfuric acid with a dull violet coloration. On pouring this solution into water, the dyestuff separates in the form of brown flakes. The dyestuff yields with alkaline hydrosulfite a reddish-brown vat, from which cotton, after oxidation and soaping, is dyed clear reddish-brown shades of superior fastness to chlorine and boiling. The new product most probably corresponds to the formula:—

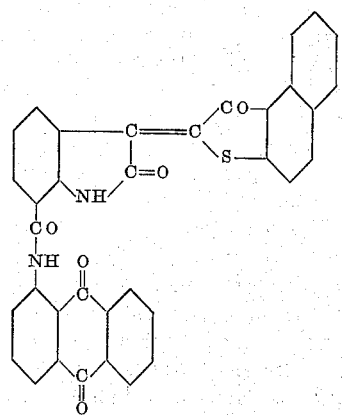

Example 3

225 parts of 5-chloro-isatin-7-carboxylic acid are heated to 120° C. for one hour, while stirring, with 184 parts of 5-chlorohydroxy-thionaphthene in 2000 parts of chlorobenzene after the addition of 20 parts of phosphorus oxychloride. The red dyestuff, which separates, is filtered after cooling, washed and dried.

391 parts of this dyestuff are converted into the acid chloride by heating with 250 parts of thionyl chloride as described in Example 1, the acid chloride is isolated and dried.

409 parts of this chloride, most finely powdered are heated to 190° C., while stirring, with 342 parts of 1-amino-5-benzoylamino-anthraquinone in nitrobenzene, until the evolution of hydrochloric acid gas ceases. The dyestuff, which separates while still hot, is filtered at 100° C., washed and dried. It forms a red powder, which is nearly insoluble in the usual organic solvents and dissolves in sulfuric acid with a blackish-violet coloration. From the dark violet vat cotton is dyed a violet black. After oxidation and soaping, a clear, powerful and very fast orange-red is obtained. The new product most probably corresponds to the formula:—

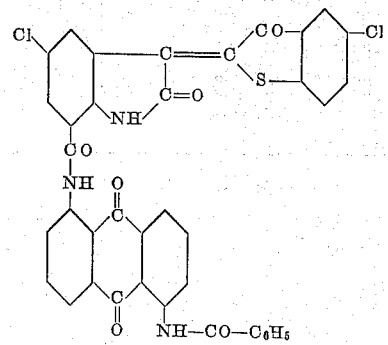

The hitherto unknown 5-chloro-isatin-7-carboxylic acid can be obtained from isatin-7-carboxylic acid by chlorination in chlorobenzene by means of sulfuryl chloride. It forms an intense yellow crystalline powder, which decomposes at 260° C.

Example 4

191 parts of isatin-5-carboxylic acid are heated to 120° C. for one hour, while stirring, with 180 parts of 6-methoxy-hydroxy-thionaphthene in chlorobenzene after the addition of 10 parts of phosphorus oxy-chloride. The orange colored dyestuff, which separates, is isolated and very finely powdered.

353 parts of this dyestuff are converted by heating with 250 parts of thionyl chloride, with stirring, in a manner analogous to that described in Example 1, into the acid chloride, which separates while still hot as an orange colored crystalline precipitate. It is isolated, washed and dried.

371 parts of this product are heated to 190° C. with 223 parts of alpha-aminoanthraquinone in nitrobenzene, until the reaction, which proceeds with evolution of hydrochloric acid, is complete. The dyestuff, which separates while still hot, is filtered hot, washed and dried. It forms an orange colored powder, which is nearly insoluble in the usual organic solvents. The solution in sulfuric acid is yellowish-red. From the reddish-brown hydrosulfite vat vegetable and animal fibers are dyed brown shades. After oxidation and soaping a fast yellowish-orange is obtained. The new product most probably corresponds to the formula:—

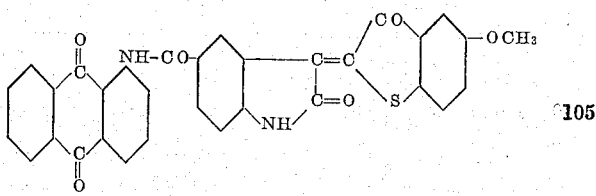

The hitherto unknown isatin-5-carboxylic acid can easily be obtained from para-aminobenzoic acid ester by the process described by Sandmeyer (Helv. chim. acta, 1919, page 238). It forms a light yellow powder, which dissolves in cold sodium carbonate solution with a yellow coloration. On the cautious addition of caustic soda the solution becomes dark brown, but quickly turns to light yellow again. The acid sinters at 250° C. but is still unmelted at 280° C.

Example 5

191 parts of isatin-7-carboxylic acid are heated to 100° C. for 2 hours, with stirring, under a reflux condenser with 250 parts of thionyl chloride in 1000 parts of chlorobenzene. Sulfur dioxide and hydrochloric acid are evolved. The temperature is maintained, until the evolution of gases ceases. After cooling, the isatin-7-carboxylic acid chloride, which separates in form of yellow crystals, is filtered, washed with chlorobenzene and dried.

210 parts of this chloride are heated gradually to 150° C., while stirring, with 223 parts of alpha-aminoanthraquinone and 1500 parts of ortho-dichlorobenzene, whereupon after temporary solution the isatin-7-carbonyl-alpha-aminoanthraquinone separates in a crystalline form while still hot. Heating is continued, until the evolution of hydrochloric acid gas and therewith the reaction is complete. The substance which separates is, after cooling, isolated in the customary manner. It forms a yellowish crystalline powder, which is still unmelted at 280° C. It yields a bluish red vat and gives light yellow dyeings on cotton.

396 parts of this product and 200 parts of 4.5-benzo-hydroxy-thionaphthene are heated to 150° C., with stirring, in 5000 parts of ortho-dichlorobenzene, and 20 parts of phosphorous oxychloride are added. After a short time the separation of the dyestuff begins. As soon as the reaction is complete, the dyestuff is filtered while still hot, washed with chlorobenzene and dried.

It is identical with that obtainable in accordance with Example 2.

The above examples can be modified, as desired, by using other hydroxy-thionaphthenes, isatins or aminoanthraquinones, whereby dyestuffs of the most varied shades can be obtained. In the following table a number of such dyestuffs is set forth:

ortho-dichlorobenzene into the acid chloride, which, after isolation, forms a crystalline scarlet-red powder. 390 parts of this chloride are condensed to the dyestuff by heating with 223 parts by weight of beta-aminoanthraquinone in nitrobenzene. The yield exceeds 90%. The dyestuff is a scarlet-red crystalline powder, which is nearly insoluble in the usual organic solvents. It dissolves in sulfuric acid with a deep red coloration. From this solution the dyestuff is obtained in orange red flakes on pouring the solution into water. The dyestuff yields with alkaline hydrosulfite a yellowish-brown vat, from which cotton, after oxidation and soaping, is dyed clear scarlet-red shades of good fastness properties, especially to chlorine and soaping. The new dyestuff most probably corresponds to the formula:—

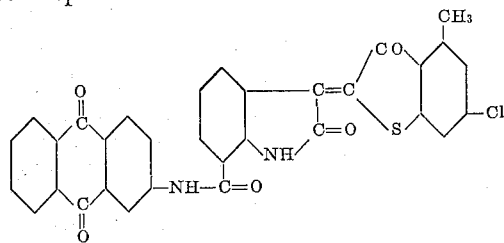

*Example 7.—2.5-dicarboxyphenyl-1-thioglycollic acid*

124 parts of 2-amino-terephthalic acid are dissolved in 500 parts of hot water, to which have been added 182 parts of 33% aqueous

| Isatin components | Hydroxythionaphthene components | Anthraquinone components | Dyeing on cotton |
|---|---|---|---|
| Isatin-7-carboxylic acid | 6-ethoxy-hydroxythionaphthene | α-aminoanthraquinone | Yellowish-orange |
| Isatin-7-carboxylic acid | 6-ethoxy-hydroxythionaphthene | 1-amino-5-benzoylaminoanthraquinone | Yellowish-orange |
| Isatin-7-carboxylic acid | 6-methoxy-hydroxythionaphthene | α-aminoanthraquinone | Yellowish-orange |
| Isatin-7-carboxylic acid | 4.6-dimethyl-hydroxythionaphthene | 1-amino-5-benzoylaminoanthraquinone | Reddish-orange |
| Isatin-7-carboxylic acid | 4-methyl-6-chlorohydroxythionaphthene | α-aminoanthraquinone | Reddish-orange |
| Isatin-7-carboxylic acid | 4.6-dimethyl-hydroxythionaphthene | 1-amino-4-benzoylaminoanthraquinone | Red |
| Isatin-7-carboxylic acid | 5.6.7-trichlorohydroxythionaphthene | 1-amino-5-benzoylaminoanthraquinone | Reddish-orange |
| Isatin-7-carboxylic acid | 4.7-dimethyl-5-chlorohydroxythionaphthene | 1-amino-5-benzoyl-aminoanthraquinone | Brownish-red |
| Isatin-7-carboxylic acid | 5-chloro-hydroxythionaphthene | α-aminoanthraquinone | Red |
| 5-chloro-isatin-7-carboxylic acid | 5-bromohydroxythionaphthene | α-aminoanthraquinone | Red |
| Isatin-7-carboxylic acid | 4.7-dimethyl-5-chlorohydroxythionaphthene | α-aminoanthraquinone | Red |
| Isatin-7-carboxylic acid | 4.5-benzohydroxythionaphthene | α-aminoanthraquinone | Reddish-brown |
| Isatin-7-carboxylic acid | Bz-4-chloro-6.7-benzohydroxythionaphthene (see Br. Pat. No. 222,120) | 1-amino-5-benzoylaminoanthraquinone | Yellowish-brown |
| Isatin-7-carboxylic acid | 5.6-benzo-7-chlorohydroxythionaphthene | α-aminoanthraquinone | Bordeaux |
| Isatin-7-carboxylic acid | 6-methoxy-hydroxythionaphthene | β-aminoanthraquinone | Orange-yellow |
| Isatin-7-carboxylic acid | 3-chlorohydroxythionaphthene | β-aminoanthraquinone | Red |
| Isatin-7-carboxylic acid | 4-methyl-6-chlorohydroxythionaphthene | β-aminoanthraquinone | Scarlet-red |

*Example 6*

From 191 parts of isatin-7-carboxylic acid and 198.5 parts of 4-methyl-6-chlorohydroxythionaphthene the indigoid intermediate product is produced as described in Example 1. It is obtained in this manner in the form of a red powder. 371.5 parts of this intermediate product are converted by heating with 250 parts of thionyl chloride in sodium hydroxide solution. The solution is stirred into a mixture of 280 parts of 33% hydrochloric acid and ice. The free acid thereupon separates as a fine paste and is diazotized with an aqueous solution of 46 parts of sodium nitrite.

Meanwhile a sodium polysulfide solution is made up from 170 parts of crystallized sodium sulfide, 23 parts of sulfur and 200 parts of water containing 306 parts of 33% aqueous sodium hydroxide solution.

The diazotization mixture is then stirred at 0–5° C. into the sodium polysulfide solution. When the evolution of nitrogen has ceased, heating is effected to 25–30° C. The mixture is then rendered acid to Congo red, and the disulfide-tetracarboxylic acid is filtered by suction and washed with water. It is purified by dissolving it in dilute sodium carbonate solution and reprecipitating. The still damp precipitate is mixed with 1000 parts of water and 200 parts of zinc dust, and 500 parts of 33% hydrochloric acid are added slowly, while stirring at about 90–100° C. After stirring, for some 3–4 hours, the 1-thiophenol-2.5-dicarboxylic acid is filtered by suction, washed with water, dissolved in 1000 parts of water and 245 parts of 33% aqueous sodium hydroxide solution and filtered from any remaining zinc dust. 70 parts of monochloroacetic acid, dissolved in 300 parts of water, and 90 parts of 33% sodium hydroxide solution are added to the filtrate. After heating to 60–70° C. for half an hour, the solution is rendered acid to Congo red by means of hydrochloric acid and boiled, whereupon the separated 2.5-dicarboxyphenyl-1-thioglycollic acid is filtered, washed and dried.

The yield amounts to 125 parts by weight.

The acid is very sparingly soluble in indifferent solvents and remains unmelted at 250° C.

*3-hydroxy-thionaphthene-6-carboxylic acid*

110 parts of 2,5-dicarboxyphenyl-1-thioglycollic acid are heated to boiling in 600 parts of acetic anhydride, until solution has taken place and carbon dioxide is no longer evolved, which is the case after about half an hour. After the reaction is complete, the acetic anhydride is decomposed by heating to boiling with 3000 parts of water, to which have been added 100 parts of 33% hydrochloric acid. On cooling, the hydroxythionaphthene-6-carboxylic acid separates as a greenish-yellow crystalline precipitate. It is filtered by suction, washed with water and crystallized from glacial acetic acid, acetic anhydride or nitrobenzene. On heating to 250° C. it remains unmelted and sublimes.

The yield amounts to 90 parts by weight.
Manufacture of the dyestuff of the probable formula

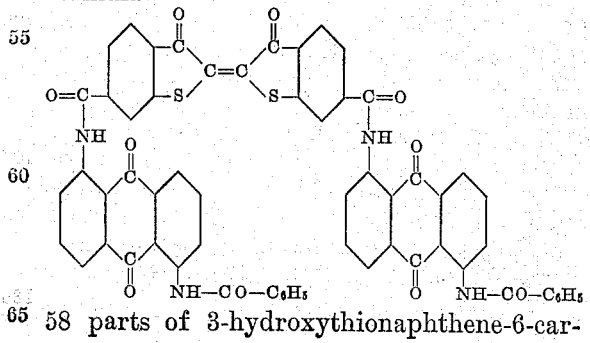

58 parts of 3-hydroxythionaphthene-6-carboxylic acid are dissolved in dilute sodium carbonate solution and oxidized with potassium ferricyanide solution to thioindigo-6.6'-dicarboxylic acid. From the red solution the dyestuff is precipitated by means of hydrochloric acid and the red precipitate is filtered, washed with water and dried. The yield amounts to 54 parts by weight.

48 parts of finely powdered thioindigo-6.6'-dicarboxylic acid are heated slowly to 160–180° C., while stirring, with 75 parts of thionyl chloride in 10 times the quantity of ortho-dichlorobenzene. Evolution of sulfur dioxide and hydrogen chloride occurs with partial solution and the separation of the di-acid chloride soon follows. As soon as the reaction is complete, which is perceptible from the abatement of the evolution of gases, the reaction mass is allowed to cool and the dichloride, which separates in a crystalline form is filtered, washed and dried. The yield amounts to 48 parts by weight.

40 parts of this di-chloride are heated to 180–200° C., while stirring with 68 parts of 1-amino-5-benzoyl-aminoanthraquinone in 10 times the quantity of nitrobenzene. The dyestuff is produced with evolution of hydrogen chloride. When the evolution of hydrogen chloride has abated, the mixture is allowed to cool and the dyestuff is filtered, washed and dried.

The dyestuff forms a brown crystalline powder. With alkaline hydrosulfite it yields a reddish-brown vat, from which cotton is dyed, after oxidation and soaping, deep, clear, fast brown shades.

*Example 8*

Manufacture of the dyestuff of the probable formula

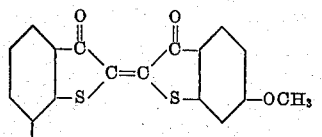

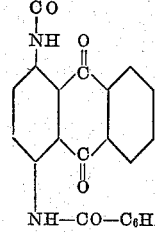

58 parts of 3-hydroxythionaphthene-7-carboxylic acid and 94 parts of the dimethylamino anil of 6-methoxy-3-hydroxythionaphthene are heated to 100° C. in 580 parts of glacial acetic acid, while stirring, until the mixed thioindigo has been produced. The dyestuff, which separates as a red crystalline paste in the calculated quantity, is filtered, washed and dried.

100 parts of the finely powdered intermediate product are heated slowly to 160–180° C., while stirring, with 100 parts of thionyl chloride in 10 times the quantity of ortho-dichlorobenzene. As soon as the acid chloride has been formed, heating is discontinued and the red crystalline precipitate is filtered after cooling, washed and dried. The yield amounts to 100 parts by weight.

40 parts of the chloride are heated to 180–200° C., while stirring, with 34 parts of 1-amino-4-benzoylaminoanthraquinone in 10 times the quantity of nitrobenzene. The dyestuff is produced with evolution of hydrogen chloride. After completion of the reaction and cooling, the dyestuff is filtered with suction, washed and dried. It forms a red crystalline powder, which is nearly insoluble in the usual organic solvents. The coloration of the solution in concentrated sulfuric acid is green. With alkaline hydrosulfite it yields a reddish-brown vat, from which cotton is dyed, after oxidation and soaping, deep, fast red shades.

*Example 9*

Manufacture of the dyestuff of the probable formula

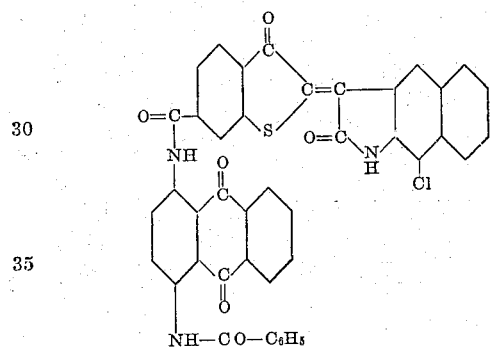

58 parts of 3-hydroxythionaphthene-6-carboxylic acid and 70 parts of 1-chloro-2.3-naphthisatin are heated to boiling, while stirring, in 580 parts of glacial acetic acid with the addition of 3 parts of hydrochloric acid, until the condensation is complete. The dyestuff, which separates in the calculated quantity as a reddish-brown precipitate, is isolated, washed and dried.

95 parts of the finely powdered intermediate product are heated to 160–180° C., while stirring, with 95 parts of thionyl chloride in 10 times the quantity of ortho-dichlorobenzene. As soon as the acid chloride has been formed, heating is discontinued, and, after cooling, the brown, lustrous needles are filtered by suction, washed and dried. The yield amounts to 95 parts by weight.

70 parts of the chloride are heated to 180–200° C., while stirring, with 55 parts of 1-amino-4-benzoylaminoanthraquinone in 10 times the quantity of nitrobenzene. The dyestuff is produced with evolution of hydrogen chloride. After completion of the reaction and cooling, the reddish-brown crystalline precipitate is filtered, washed and dried. It dissolves in concentrated sulfuric acid with a green coloration and yields with alkaline hydrosulfite a red vat, from which cotton is dyed, after oxidation and soaping, deep, fast reddish brown shades.

*Example 10*

Manufacture of the dyestuff of the probable formula

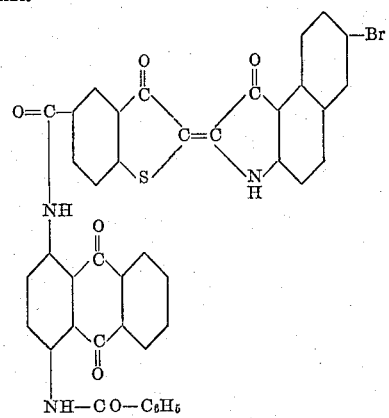

58 parts of 3-hydroxythionaphthene-6-carboxylic acid are dissolved in 600 parts of nitrobenzene. To this solution is added at about 130° C., while stirring, a solution of monobromo-2.1-naphthisatin-chloride prepared from:—

| | Parts |
|---|---|
| Monobromo-2.1-naphthisatin | 83 |
| Dichlorobenzene | 500 |
| Phosphorous pentachloride | 70 |

The thionaphthene-indole-indigo is produced with evolution of hydrogen chloride. The violet crystalline precipitate is filtered with suction, washed and dried. The yield amounts to 130 parts by weight.

45 parts by weight of the intermediate product are converted into the acid chloride by heating to 160–180° C. with 25 parts of thionyl chloride in orthodichlorobenzene. When the evolution of sulfur dioxide and hydrogen chloride has abated and after cooling, the acid chloride is filtered, washed and dried.

47 parts of the chloride are heated to 180–200° C., while stirring, with 35 parts of 1-amino-4-benzoylaminoanthraquinone in 10 times the quantity of nitrobenzene, until the formation of the dyestuff is complete. After cooling to 80° C., it is filtered with suction, washed and dried.

The dyestuff forms a black, crystalline powder, which is nearly insoluble in the usual organic solvents and dissolves in concentrated sulfuric acid with a green coloration. With alkaline hydrosulfite it yields a reddish-brown vat, from which cotton is dyed black shades after oxidation. When in the above example the 1-amino-4-benzoylaminoanthraquinone is replaced by the same quantity of 1-amino-5-benzoylaminoanthraquinone, a dyestuff is obtained, which dyes cotton from the vat olive green shades.

Example 11

Manufacture of the dyestuff of the probable formula

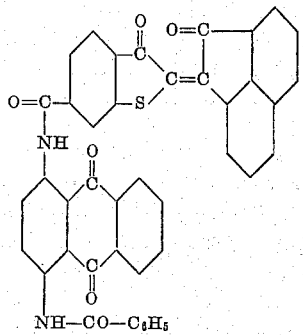

40 parts of 3-hydroxythionaphthene-6-carboxylic acid and 40 parts of acenaphthenequinone are heated to boiling, while stirring, in 400 parts of glacial acetic acid with the addition of 2 parts of hydrochloric acid, until the condensation is complete. The dyestuff, which separates in the calculated quantity as a red precipitate, is isolated, washed and dried. 35.8 parts of the finely powdered intermediate product are heated to 160–180° C., while stirring, with 29.5 parts of thionyl chloride in 10 times the quantity of ortho-dichlorobenzene. As soon as the acid chloride has been formed, heating is discontinued, and, after cooling, the red crystals are filtered with suction, washed and dried. The yield amounts to 36 parts by weight. 38 parts of the chloride are heated to 180–200° C., while stirring, with 34 parts of 1-amino-4-benzoylaminoanthraquinone in 10 times the quantity of nitrobenzene. The dyestuff is produced with evolution of hydrogen chloride. After completion of the reaction and cooling, the red crystalline precipitate is filtered with suction, washed and dried. It yields with alkaline hydrosulfite a green vat, from which cotton is dyed, after oxidation and soaping, deep, clear, fast, scarlet-red shades.

Example 12

Manufacture of the dyestuff of the probable formula

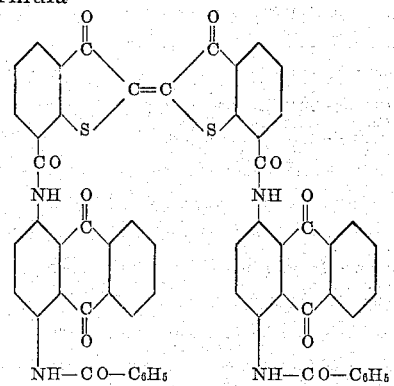

58 parts of 3-hydroxy-thionaphthene-7-carboxylic acid are dissolved in dilute sodium carbonate solution and oxidized with potassium ferricyanide solution to thioindigo-7.7′-dicarboxylic acid. From the red solution the dyestuff is precipitated by means of hydrochloric acid, and the red precipitate is filtered, washed and dried. The yield amounts to 54 parts by weight. 48 parts of finely powdered thioindigo-7.7′-dicarboxylic acid are heated slowly to 160–180° C., while stirring, with 75 parts of thionyl chloride in 10 times the quantity of ortho-dichlorobenzene. Evolution of sulfur dioxide and hydrogen chloride occurs with partial solution, and separation of the di-acid chloride soon follows. As soon as the reaction is complete, which is perceptible from the abatement of the evolution of gases, and after cooling, the dichloride, which separates in a crystalline form, is filtered with suction, washed and dried. The yield amounts to 48 parts by weight.

40 parts of this dichloride are heated to 180–200° C., while stirring, with 68 parts of 1-amino-4-benzoylamino-anthraquinone in 10 times the quantity of nitrobenzene. The dyestuff is produced with evolution of hydrogen chloride. When the evolution of hydrogen chlorde has abated, and after cooling, the dyestuff is filtered, washed and dried.

The dyestuff forms a reddish crystalline powder. With alkaline hydrosulfite it yields a bluish-red vat, from which cotton is dyed, after oxidation and soaping, clear, fast red shades.

Example 13

Manufacture of the dyestuff of the probable formula

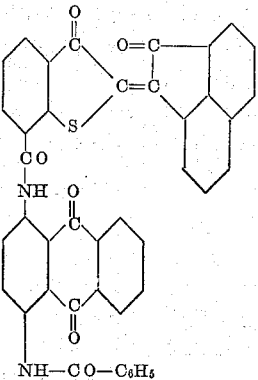

40 parts of 3-hydroxy-thionaphthene-7-carboxylic acid and 40 parts of acenaphthenequinone are heated to boiling, while stirring, in 400 parts of glacial acetic acid with the addition of 2 parts of hydrochloric acid, until the condensation is complete. The dyestuff, which separates in the calculated quantity as a red precipitate, is isolated, washed and dried.

35.8 parts of the finely powdered intermediate product are heated to 160–180° C., while stirring, with 29.5 parts by weight of thionyl chloride in 10 times the quantity of ortho-dichlorobenzene. As soon as the acid chloride has been formed and after cooling, the red crystals are filtered with suction, washed and dried. Instead of 29.5 parts of thionyl chloride, 27 parts of phosphorous pentachloride can be employed in a similar manner.

38 parts of the chloride are heated to 180–200° C., while stirring, with 34 parts of 1-amino-4-benzoylaminoanthraquinone in 10 times the quantity of nitrobenzene. The dyestuff is produced with evolution of hydrochloric acid. After the completion of the reaction and cooling, the red crystalline precipitate is filtered with suction, washed and dried. It yields with alkaline hydrosulfite a violet vat, from which cotton is dyed, after oxidation and soaping, deep, clear, red shades.

Example 14

Manufacture of the dyestuff of the probable formula

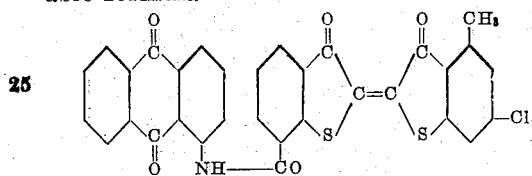

58 parts of 3-hydroxythionaphthene-7-carboxylic acid and 109 parts of the dimethylamino-anil of 4-methyl-6-chloro-3-hydroxythionaphthene are heated to 100° C. with 580 parts of glacial acetic acid, until the mixed thioindigo is formed. The red crystalline precipitate has been filtered off, washed and dried.

100 parts of this product (well powdered) are heated, whilst stirring, to 160–180° C. with 100 parts of thionyl chloride and ten times the quantity of ortho-dichlorobenzene. After the acid chloride is produced, the red crystals are filtered off from the cooled mixture, washed and dried.

40.7 parts of this chloride are heated to 180–200° C., whilst stirring, together with 22.3 parts of alpha-aminoanthraquinone in ten times the quantity of nitrobenzene. After the reaction is complete, the dye is filtered off, washed and dried. It is a red crystalline powder, difficultly soluble in the usual organic solvents, soluble in concentrated sulfuric acid with a green coloration. From its alkaline hydrosulfite vat cotton is dyed fast red shades.

Thioindigos

| Hydroxythionaphthene-carboxylic acid components | Hydroxythionaphthene components coupled as alpha-derivatives | Anthraquinone components | Dyeing on cotton |
| --- | --- | --- | --- |
| 3-hydroxythionaphthene-6-carboxylic acid | 6-methoxyhydroxythionaphthene | 1-amino-5-benzoylaminoanthraquinone | Reddish-orange |
| 3-hydroxythionaphthene-6-carboxylic acid | 6-methoxyhydroxythionaphthene | 1-amino-4-benzoylaminoanthraquinone | Red |
| 3-hydroxythionaphthene-6-carboxylic acid | 6-methoxyhydroxythionaphthene | 1-amino-4-methoxy-anthraquinone | Red |
| 3-hydroxythionaphthene-6-carboxylic acid | Bz-4-chloro-6.7-benzohydroxythionaphthene | 1-amino-4-benzoylaminoanthraquinone | Reddish-brown |
| 3-hydroxythionaphthene-6-carboxylic acid | Bz-4-chloro-6.7-benzohydroxythionaphthene | 1-amino-5-benzoylaminoanthraquinone | Anthracene brown |
| 3-hydroxythionaphthene-7-carboxylic acid | 5.6-benzo-7-chlorohydroxythionaphthene | 1-amino-5-benzoylaminoanthraquinone | Dark brown |
| 4-ethoxyhydroxythionaphthene-7-carboxylic acid | 4-methyl-6-chlorohydroxythionaphthene | 1-amino-4-benzoylaminoanthraquinone | Rubin-red |

2-thionaphthene-3-indole-indigos

| 3-hydroxythionaphthene-carboxylic acid components | Isatin components | Anthraquinone components | Dyeing on cotton |
| --- | --- | --- | --- |
| 3-hydroxythionaphthene-6-carboxylic acid | 5.7-dichloroisatin | α-aminoanthraquinone | Reddish-brown |
| 3-hydroxythionaphthene-6-carboxylic acid | 5.7-dichloroisatin | 1-amino-4-benzoylaminoanthraquinone | Copper-red |
| 3-hydroxythionaphthene-6-carboxylic acid | 5.7-dichloroisatin | 1-amino-5-benzoylaminoanthraquinone | Brownish-red |
| 3-hydroxythionaphthene-6-carboxylic acid | 5.7-dichloroisatin | 1-amino-4-methoxy-anthraquinone | Reddish-brown |
| 3-hydroxythionaphthene-6-carboxylic acid | Isatin-7-carboxylic acid | α-aminoanthraquinone (2 mols.) | Reddish-brown |
| 3-hydroxythionaphthene-6-carboxylic acid | Isatin-7-carboxylic acid | 1-amino-4-benzoylaminoanthraquinone (2 mols.) | Copper-red |
| 3-hydroxythionaphthene-6-carboxylic acid | Isatin-7-carboxylic acid | 1-amino-4-benzoylaminoanthraquinone (2 mols.) | Brown |
| 3-hydroxythionaphthene-6-carboxylic acid | Isatin-7-carboxylic acid | β-aminoanthraquinone (2 mols.) | Red |
| 3-hydroxythionaphthene-6-carboxylic acid | 1-chloro-2.3-naphthisatin | 1-amino-4-benzoylaminoanthraquinone | Reddish-brown |
| 3-hydroxythionaphthene-6-carboxylic acid | 1-chloro-2.3-naphthisatin | 1-amino-5-benzoylaminoanthraquinone | Brown |
| 3-hydroxythionaphthene-7-carboxylic acid | 5.7-dichloroisatin | 1-amino-5-benzoylaminoanthraquinone | Reddish-brown |

2-thionaphthene-2-indole-indigos

| Hydroxythionaphthene-carboxylic acid components | Isatin components coupled as α-derivatives | Anthraquinone components | Dyeing on cotton |
|---|---|---|---|
| 3-hydroxythionaphthene-6-carboxylic acid | Monobromo-2.1-naphthisatin | 1-amino-4-benzoylaminoanthraquinone | Black |
| 3-hydroxythionaphthene-6-carboxylic acid | Monobromo-2.1-naphthisatin | 1-amino-5-benzoylaminoanthraquinone | Olive green |
| 3-hydroxythionaphthene-6-carboxylic acid | 1-chloro-2.3-naphthisatin | 1-amino-5-benzoylaminoanthraquinone | Green |
| 3-hydroxythionaphthene-6-carboxylic acid | 1-chloro-2.3-naphthisatin | 1-amino-4-benzoylaminoanthraquinone | Bluish-black |

Other dyestuffs

| Hydroxythionaphthene-carboxylic acid components | o-diketone-components | Anthraquinone components | Dyeing on cotton |
|---|---|---|---|
| 3-hydroxythionaphthene-6-carboxylic acid | Acenaphthenequinone | 1-amino-4-benzoylaminoanthraquinone | Red |
| 3-hydroxythionaphthene-7-carboxylic acid | Acenaphthenequinone | 1-amino-4-benzoylaminoanthraquinone | Red |
| 3-hydroxythionaphthene-6-carboxylic acid | Oxidized to the corresponding thio-indigo | 1-amino-5-benzoylaminoanthraquinone | Brown |
| 3-hydroxythionaphthene-7-carboxylic acid | Oxidized to the corresponding thio-indigo | 1-amino-4-benzoylaminoanthraquinone | Red |

We claim:—

1. The new vat dyestuffs of the probable general formula

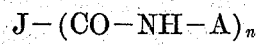

$$J-(CO-NH-A)_n$$

wherein J means the radical of an indigoid dyestuff of the group consisting of thionaphthene-indole indigos thionaphthene-acenaphthene indigos and thioindigos, A stands for an anthraquinone nucleus, which may be substituted by halogen atoms, alkyl-alkoxy- or aroylamino groups, n means one of the numbers 1 or 2, and wherein the $$-CO-NH-A$$

group is linked to a carbocyclic nucleus of the radical J, said dyestuffs forming yellow-orange to black crystals, difficultly soluble in the usual organic solvents, dissolving in strong sulfuric acid with various colorations, dyeing cotton from an alkaline hydrosulfite vat strong orange to black shades of good fastness properties.

2. The new vat dyestuffs of the probable general formula

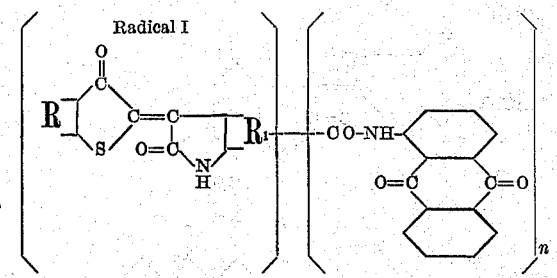

wherein R and R₁ stand for benzene or naphthalene nuclei, n means one of the numbers 1 or 2, wherein the nuclei R and R₁ and the anthraquinone nucleus may be further substituted by halogen atoms, alkyl-alkoxy- or aroylamino groups, and wherein the —CO—NH— group is linked to a carbocyclic nucleus of radical I, said dyestuffs forming orange to brown to red crystals difficultly soluble in the usual organic solvents, soluble in strong sulfuric acid with various colorations, dyeing cotton from an alkaline hydrosulfite vat orange to brown to red shades of good fastness properties.

3. The new vat dyestuffs of the probable general formula

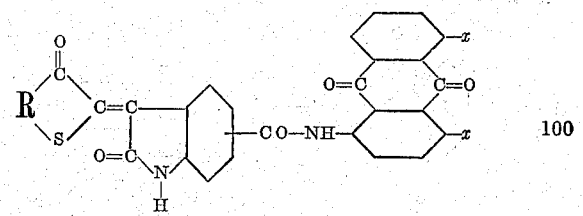

wherein R stands for a benzene or naphthalene nucleus, the x's stand for hydrogen or one x means hydrogen and the other x a benzoylamino group, and wherein the carbocyclic nuclei of the indigoid radical may be substituted by halogen atoms, alkyl- or alkoxy groups, said dyestuffs forming orange to brown to red crystals, difficultly soluble in the usual organic solvents, soluble in strong sulfuric acid with various colorations, dyeing cotton from an alkaline hydrosulfite vat orange to brown to red shades of good fastness properties.

4. The new vat dyestuffs of the probable general formula

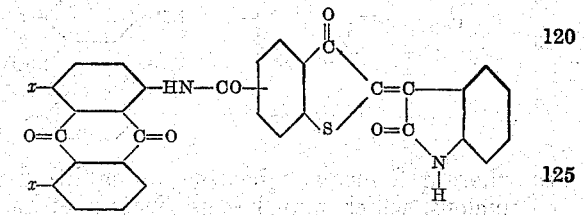

wherein the x's mean hydrogen or one x means hydrogen and the other x a benzoylamino group, and wherein the benzene nuclei of the indigoid radical may be substituted by halogen atoms, alkyl- or alkoxy groups, said dyestuffs forming orange to red to brown crystals, difficultly soluble in the usual organic solvents, soluble in strong sulfuric acid with various colorations dyeing cotton from an alkaline hydrosulfite vat orange to red to brown shades of good fastness properties.

5. The new vat dyestuffs of the probable general formula

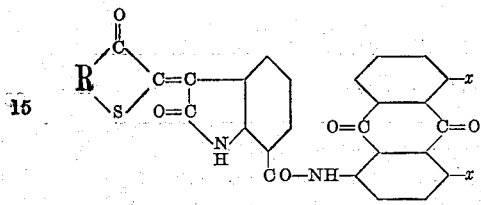

wherein R stands for a benzene or naphthalene nucleus, which may be substituted by halogen atoms, alkayl- or alkoxy groups, and wherein the $x$'s mean hydrogen or one $x$ means hydrogen and the other $x$ the benzoylamino group, said dyestuffs forming yellowish-orange to red crystals, dyeing cotton from an alkaline hydrosulfite vat yellowish-orange to red shades of good fastness properties.

6. The new vat dyestuffs of the probable general formula

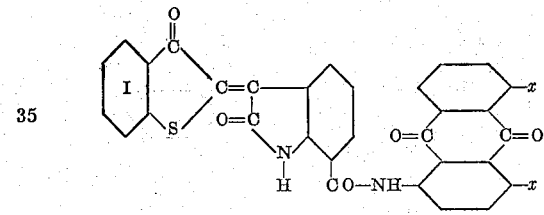

wherein the $x$'s mean hydrogen or one $x$ stands for hydrogen and the other $x$ for the benzoylamino group, and wherein the nucleus marked I may be substituted by halogen atoms, alkyl or alkoxy groups, said dyestuffs forming yellowish-orange to red crystals, dyeing cotton from an alkaline hydrosulfite vat yellowish-orange to red shades of good fastness properties.

7. The new vat dyestuffs of the probable general formula

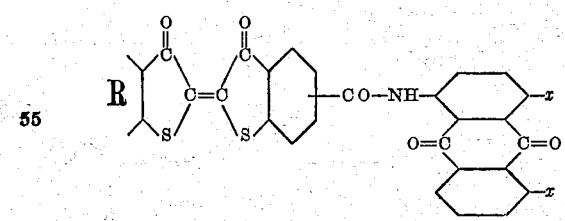

wherein R means a benzene or naphthalene nucleus, which may be substituted by halogen atoms, alkyl- or alkoxy groups, the $x$'s mean hydrogen or one $x$ means hydrogen and the other $x$ a benzoylamino group, said dyestuffs forming yellowish-red to bluish-red to dark brown crystals, dissolving in strong sulfuric acid with various colorations, dyeing cotton from an alkaline hydrosulfite vat strong yellowish-red to bluish-red to dark brown shades of good fastness properties.

8. The new vat dyestuffs of the probable general formula

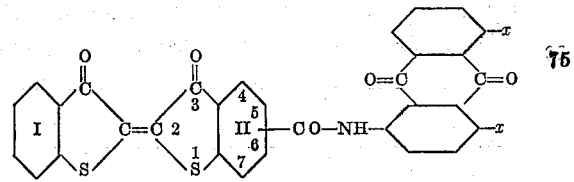

wherein the $x$'s mean hydrogen or one $x$ stands for hydrogen and the other $x$ means a benzoylamino group, wherein the nucleus marked I may be substituted by halogen atoms, alkyl- or alkoxy groups and wherein the CO—NH group is linked to the nucleus marked II in 6- or 7-position, said dyestuffs forming yellowish-red to bluish-red crystals, dissolving in strong sulfuric acid with various colorations, dyeing cotton from an alkaline hydrosulfite vat yellowish-red to bluish-red shades of good fastness properties.

9. The new vat dyestuffs of the probable general formula

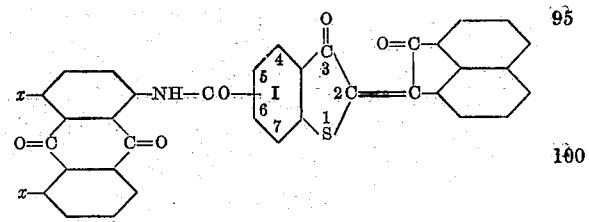

wherein the $x$'s mean hydrogen or one $x$ means hydrogen and the other $x$ a benzoylamino group, and wherein the —CO—NH— group is linked to the nucleus marked I in 6- or 7-position, said dyestuffs forming orange to red crystals, dyeing cotton from an alkaline hydrosulfite vat strong orange to red shades of good fastness properties.

10. The new dyestuff of the probable formula

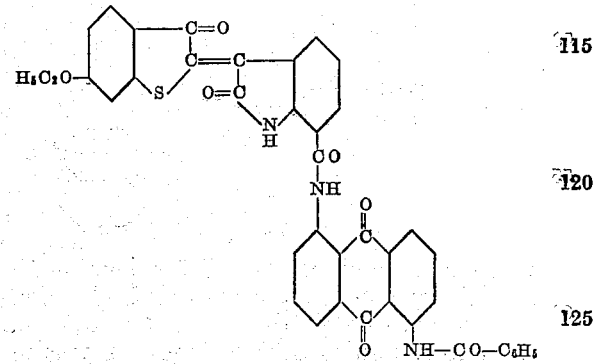

said dyestuff dyeing cotton from an alkaline hydrosulfite vat strong yellowish-orange shades of good fastness properties.

11. The new dyestuff of the probable formula

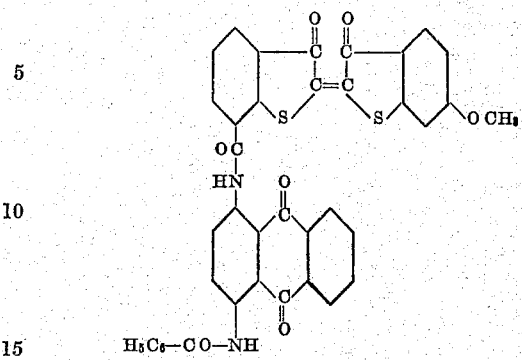

said dyestuff dyeing cotton from a reddish-brown alkaline hydrosulfite vat strong red shades of good fastness properties.

12. The new dyestuff of the probable formula

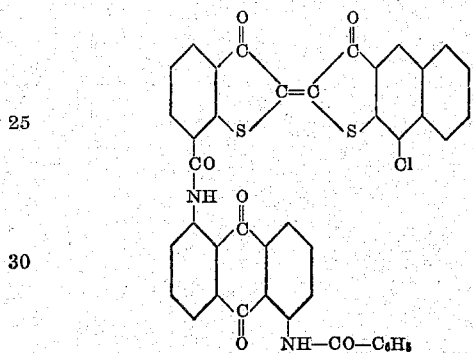

said dyestuff dyeing cotton from a brown alkaline hydrosulfite vat dark brown shades of good fastness properties.

In testimony whereof, we affix our signatures.

WILHELM BAUER.
JOSEF HALLER.
GEORG RÖSCH.